United States Patent
Saito et al.

(10) Patent No.: US 6,266,160 B1
(45) Date of Patent: *Jul. 24, 2001

(54) INTERNET FACSIMILE APPARATUS

(75) Inventors: Kyoji Saito, Kawasaki; Kiyoshi Toyoda, Kunitachi, both of (JP)

(73) Assignee: Matsushita Graphic Communication Systems, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,938

(22) Filed: May 28, 1998

(30) Foreign Application Priority Data

Jun. 2, 1997 (JP) .................................................... 9-159154

(51) Int. Cl.⁷ ..................................................... H04N 1/00

(52) U.S. Cl. .......................... 358/407; 358/1.15; 358/403; 379/100.09

(58) Field of Search ..................................... 358/402, 403, 358/407, 408, 434, 435, 436, 440, 442, 1.15; 379/93.24, 100.09, 130; 370/352, 428, 474; 395/200.3, 200.47; 709/203, 217, 218, 219, 238, 245, 239, 240, 242

(56) References Cited

U.S. PATENT DOCUMENTS

| | | | | |
|---|---|---|---|---|
| 5,115,326 | * | 5/1992 | Burgess et al. | 358/440 |
| 5,513,126 | * | 4/1996 | Harkins et al. | 395/200.58 |

(List continued on next page.)

FOREIGN PATENT DOCUMENTS

| | | |
|---|---|---|
| 5-28155 | 4/1993 | (JP) . |
| 8256235 | 10/1996 | (JP) . |
| 10042067 | 2/1998 | (JP) . |
| 10126551 | 5/1998 | (JP) . |
| 96-41463 | 12/1996 | (WO) . |
| WO 96/41463 | * 12/1996 | (WO) .............................. H04N/1/00 |
| WO 97/10668 | * 3/1997 | (WO) . |

OTHER PUBLICATIONS

Patel et al. "The multimedia fax–MIME gateway", IEEE, pp. 64–70, Feb. 1994.*
English language abstraact of JP 8–242326, published on Sep. 17, 1996.
English language abstraact of JP 5–308503, published on Nov. 19, 1993.
English language abstract of JP 8–256235.
English language abstract of JP 10–042067.
English language abstract of JP 10–126551.
English language abstract of JP 5–28155.
English Language Abstract of JP–9116728.
English Language Abstract of JP–8186598.
English Language Abstract of JP–5–219104.
English Language Abstract of JP–7–143309.
English Language Abstract of JP–4–265040.

*Primary Examiner*—Edward Coles
*Assistant Examiner*—Joseph R. Pokrzywa
(74) *Attorney, Agent, or Firm*—Greenblum & Bernstein, P.L.C.

(57) ABSTRACT

Internet facsimile apparatus 1 notifies a facsimile number of the final destination to server 3 and acquires an e-mail address of a relay apparatus from server 3. And it transmits an e-mail attached image information to Internet facsimile apparatus 2 corresponding to the acquired e-mail address. At this time, it inserts a relay transfer instruction command to a part of a header of the e-mail to order a relay transfer. Internet facsimile apparatus 2 functioning as a relay apparatus converts a specific predetermined information among the header information of the e-mail to be relay transferred into the same format as that of the image information, and transmits the converted specific information with the image information to facsimile apparatus 4 of the final destination.

22 Claims, 5 Drawing Sheets

U.S. PATENT DOCUMENTS

| | | | | |
|---|---|---|---|---|
| 5,608,786 | * | 3/1997 | Gordon | 370/352 |
| 5,689,642 | * | 11/1997 | Harkins et al. | 709/210 |
| 5,712,907 | * | 1/1998 | Wegner et al. | 379/112 |
| 5,740,230 | * | 4/1998 | Vaudreuil | 379/88.22 |
| 5,790,803 | * | 8/1998 | Kinoshita et al. | 709/245 |
| 5,812,278 | * | 9/1998 | Toyoda et al. | 358/402 |
| 5,826,034 | * | 10/1998 | Albal | 709/239 |
| 5,838,685 | * | 11/1998 | Hochman | 370/428 |
| 5,859,967 | * | 1/1999 | Kaufeld et al. | 395/186 |
| 5,862,202 | * | 1/1999 | Bashoura et al. | 379/100.14 |
| 5,881,233 | | 3/1999 | Toyoda et al. | |
| 5,974,449 | * | 10/1999 | Chang et al. | 709/206 |
| 6,009,153 | * | 12/1999 | Houghton et al. | 379/102.02 |
| 6,020,980 | * | 2/2000 | Freeman | 358/402 |
| 6,028,679 | * | 2/2000 | Murphy | 358/407 |
| 6,188,683 | * | 2/2001 | Lang et al. | 370/352 |

* cited by examiner

FIG. 3

| E-MAIL ADDREAA OF RELAY APPARATUS | TELEPHONE NUMBER | RECEPTION CAPABILITY | SUPPORTED DATA FORMAT |
|---|---|---|---|
| ifax-tokyo@domain1 | 03-5434-7059<br>03-5434-7160 | B4 - FINE | TIFF<br>JPEG<br>GIF<br>BMP |
| ifax-osaka@domain2 | 06-900-3460 | A4 - STANDARD | TIFF |
| ...... | ...... | ...... | ...... |

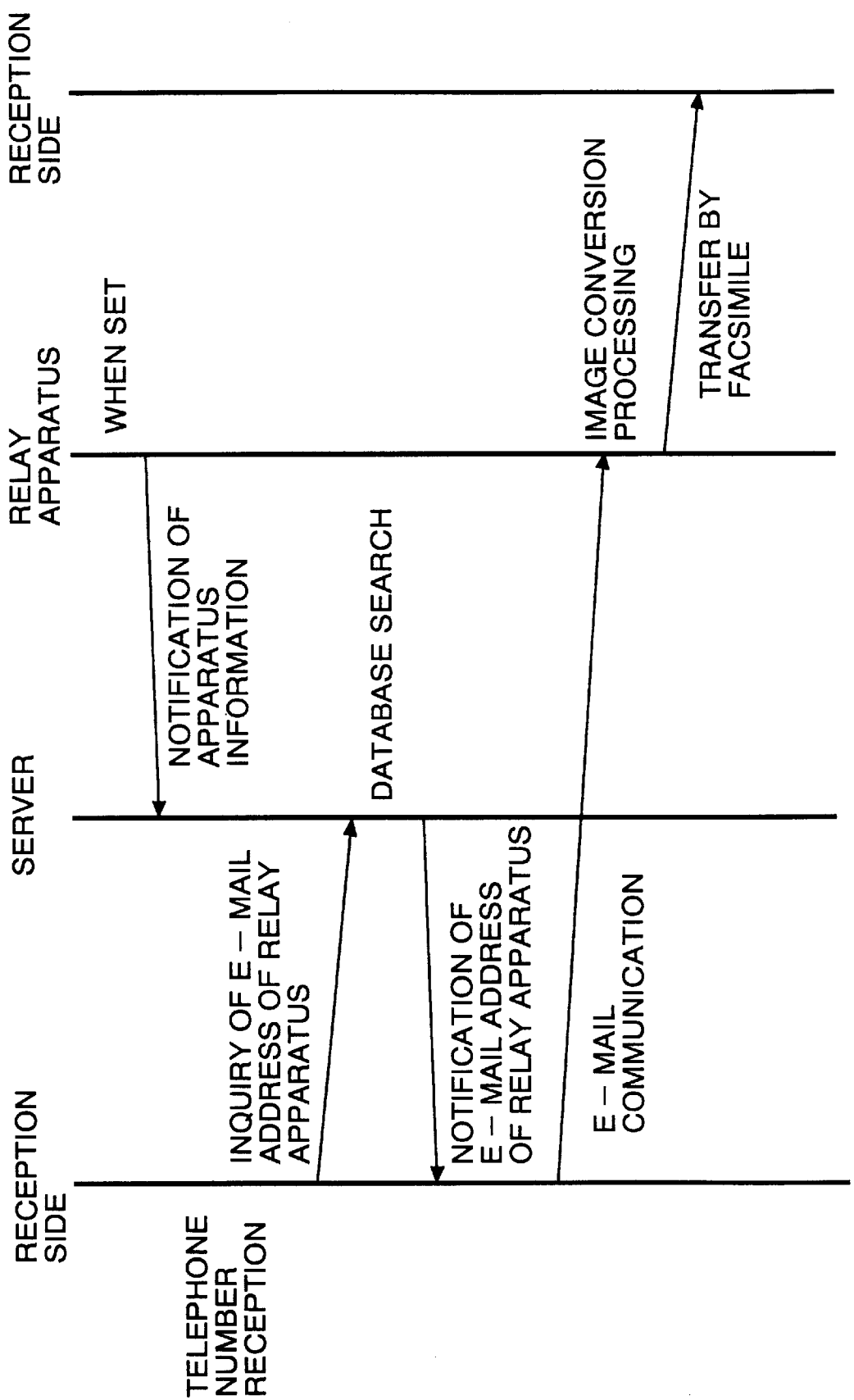

FIG. 5A

RECEPTION DATA

Received : by venus. center. cc. dd. ee.
Received : by gate . cc. dd. ee
Received : from gateway − g6 − 200
Message − id : <199705200624.PAA10376@mail. tt. uu. vv. ww>
From : Wipo @ tt. uu. vv. ww
To : kyoji @ aa. bb. cc. dd. ee
Subject : TEST
Date : Tue. 20 May 1997 15:23:20+0900
X − Nsmail − Priority : Normal
X − Priority : 3
X − Mailer : Nacrosoft Enternet Mail 4.70.1157
Mime − Version : 1.0
Content − Type : text/plain : charset=ISO − 2022 − JP
Content − Transfer − Encoding : 8bit

FACSIMILE IMAGE

FIG. 5B

DATA AFTER HEADER EDIT

From : Wipo @ tt. uu. vv. ww
To : kyoji @ aa. bb. cc. dd. ee
Subject : TEST

FACSIMILE IMAGE

INTERNET FACSIMILE APPARATUS

BACKGROUND OF THE INVENTION

1. Field of the Invention

The present invention relates to an Internet facsimile apparatus for transmitting and receiving image information in the Internet.

2. Description of the Related Art

An Internet facsimile apparatus capable of transmitting and receiving image information in the Internet has been put into practical use.

In the case where a user with an Internet facsimile apparatus communicates with another user also with an Internet facsimile apparatus, they transmit and receive image information attached e-mail by Internet. On contrast, in the case where a user with an Internet facsimile apparatus communicates with another user with an ordinary facsimile apparatus, they transmit and receive image formation by telephone line network.

And an Internet facsimile apparatus also works as a relay apparatus to transfer the received image information by Internet to a facsimile apparatus by telephone line network.

FIG. 1 is a concept diagram illustrating the case where information is transmitted from an Internet facsimile apparatus to an ordinary facsimile apparatus.

In the case of transmitting facsimile data from Internet facsimile apparatus 11 to ordinary facsimile apparatus 12, two transmission methods are considered. One is via public switched telephone network as routing A illustrated in FIG. 1, and another one is via Internet as routing B to routing C illustrated in FIG. 1.

In the transmission method via Internet, image information is transmitted by e-mail to Internet facsimile apparatus 13 working as a relay apparatus, the image information is converted to facsimile data at Internet facsimile apparatus 13, then the facsimile data is transferred to ordinary facsimile apparatus 12.

Generally, since the communication cost by e-mail is inexpensive, the communication cost can be reduced by using Internet facsimile apparatus 13 locating distance to facsimile apparatus 12 as a relay apparatus.

However in the case of transferring image information by a conventional Internet facsimile apparatus, since an operator needs to input an e-mail address and others of the Internet facsimile apparatus as a relay apparatus besides a facsimile number of facsimile apparatus of the final destination, the operation is complicated. And it has the problem that the header information of sender and others is not transferred as image information into a facsimile apparatus of the final destination.

SUMMARY OF THE INVENTION

The object of the present invention is to acquire the same output image as that obtained by telephone line network at the facsimile apparatus of the final destination when image information is transmitted via the Internet, by inputting only a facsimile number of facsimile apparatus of the final destination to transmit.

In the present invention, the above object is achieved by storing at a server e-mail addresses of Internet facsimile apparatus as a relay apparatus corresponding to facsimile numbers of facsimile apparatus of the final destination, transmitting an e-mail attached a relay transfer instruction command with a facsimile number of facsimile apparatus of the final destination to the Internet facsimile apparatus at the e-mail address notified by the server, and extracting at the Internet facsimile apparatus as a relay apparatus the facsimile number of facsimile apparatus of the final destination from the relay transfer instruction command attached to the e-mail.

BRIEF DESCRIPTION OF THE DRAWINGS

FIG. 3 is a schematic diagram illustrating a database configuration of a routing information table in the above embodiment of the present invention;

FIG. 4 is a procedure explanation diagram illustrating a relay transfer procedure of the system including an Internet facsimile apparatus in the above embodiment of the present invention;

FIG. 5A and FIG. 5B are data configuration diagrams of before and after header edit at the Internet facsimile apparatus in the above embodiment of the present invention.

DESCRIPTION OF THE PREFERRED EMBODIMENT

The embodiment of the present invention is explained with reference to drawings in the following.

Figure 1:
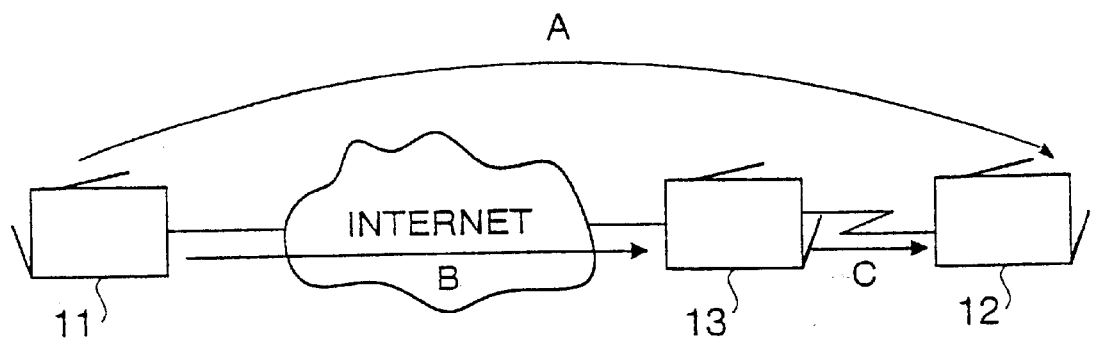
FIG. 1 is a concept diagram illustrating the case where information is transmitted from a conventional Internet facsimile apparatus to an ordinary facsimile apparatus.
Figure 2:
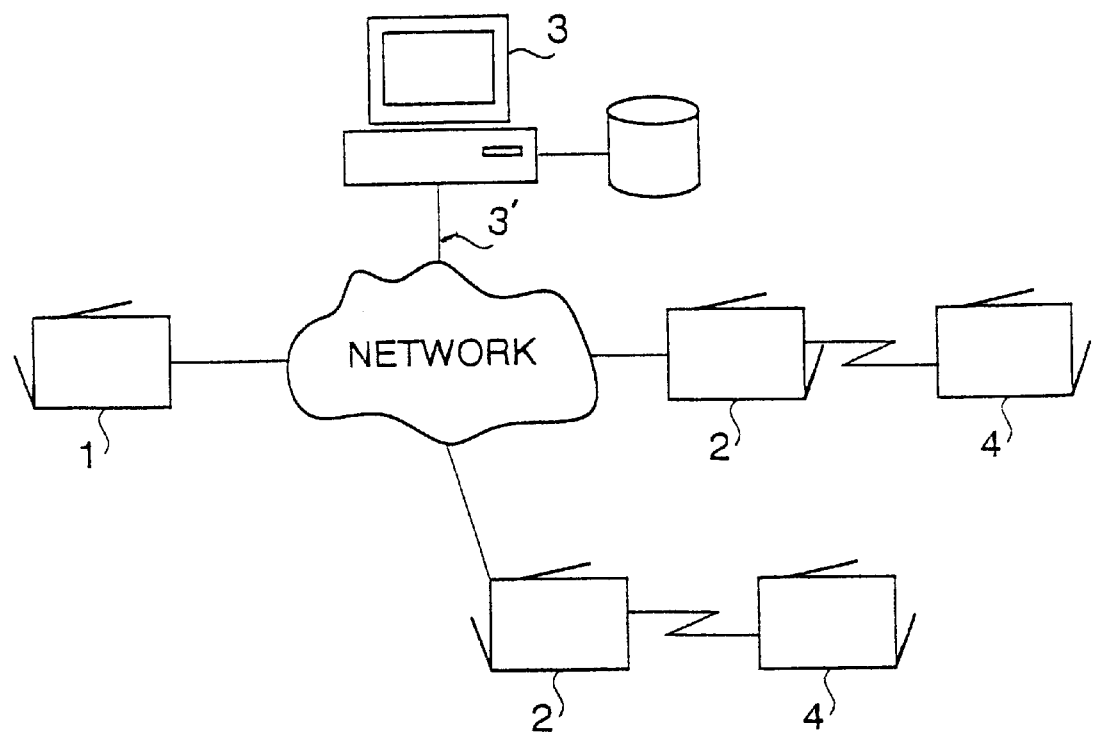
FIG. 2 is a concept diagram of a system including an Internet facsimile apparatus in the embodiment of the present invention.

FIG. 2 is a concept diagram of a system including an Internet facsimile apparatus in the embodiment of the present invention.

This system is composed of Internet facsimile apparatus 1 of the sender, Internet facsimile apparatus 2 as a relay apparatus, server 3 having a routing information table and facsimile apparatus 4 of the final destination. And Internet facsimile apparatus 1, Internet facsimile apparatus 2 and server 3 are connected to a network capable of e-mail communication. Connection 3' serves to connect the server 3 to the network. Internet facsimile apparatus 2 and facsimile apparatus 4 of the final destination implement a facsimile communication via ordinary public switched telephone network.

In the following, an Internet facsimile apparatus as a relay apparatus is abbreviated as "relay apparatus", and a facsimile apparatus of the final destination is abbreviated as "final destination".

Internet facsimile apparatus 1 and 2 are primarily composed of a scanning section for reading an original and generating image information, a data converting section for converting a data format of image information, a transmitting and receiving section for transmitting and receiving an e-mail attached image information, a recording section for recording received image information in a recording paper, a control section for controlling each section and an operating section for having different operation buttons and transferring an instruction of an operator to the control section.

For instance in the case of transmitting image information from Internet facsimile apparatus 1 to Internet facsimile apparatus 2, an operator sets an original at a scanning section and inputs at an operation section a facsimile number of a destination and push a start button.

According to the operation, the original is read at the scanning section based on control by the control section and image information is generated. The generated image information is converted into e-mail data at the data converting section then transmitted from the transmitting and receiving section as an attached file of e-mail.

The transmitted e-mail is received at Internet facsimile apparatus 2 of a destination via the Internet. The image information attached to the received e-mail is converted into facsimile data at the data converting section then output in a recording paper at the recording section.

Server 3 has a database of a routing information table in which a facsimile number of final destination 4 is corresponded to an e-mail address of relay apparatus 2.

The database is explained briefly with a schematic diagram illustrated in FIG. 3. The routing information table is composed of e-mail addresses of relay apparatus, facsimile numbers of final destinations of which each relay apparatus takes charge, reception capability indicative of image processing capability of the relay apparatus and supported data format.

To use Internet facsimile apparatus 2 as a relay apparatus, at the time Internet facsimile apparatus 2 is connected to a network, the administration items illustrated in FIG. 3 are registered in server 3. This registration may be programmed to finish automatically after an operator inputs the requirement items and transmits them to server 3 by a certain operation. After the registration is finished, Internet facsimile apparatus 2 is immediately available as a relay apparatus.

An operator transmits image information easily without negotiating with a relay apparatus by acquiring these items memorized in the database and implementing certain operations according to these items.

Next a transmission procedure is explained in the case where image information is transmitted from Internet facsimile apparatus 1 to facsimile apparatus 4 of the final destination via Internet facsimile apparatus 2 as a relay apparatus, with a procedure explanation diagram illustrated in FIG. 4.

First when an operator inputs a facsimile number of the final destination and pushes a start button, Internet facsimile apparatus 1 reads an original facsimile. Internet facsimile apparatus 1 connects to server 3 via the Internet and inquires about a relay e-mail address. The inquiring about a relay e-mail address is executed by notifying a facsimile number of the final destination with a certain message command included in a message of e-mail to server 3.

Next server 3 searches the notified facsimile number of the final destination and returns an e-mail address, the reception capability indicative of processing capability for image information, supported data format and others of the corresponding relay apparatus to Internet facsimile apparatus 1. The operations of the server 3 are explained in detail later.

As described above, an operator can acquire all information needed for transmission only by notifying a facsimile number of the final destination to server 3 without a negotiation to confirm the reception capability of a relay apparatus in each communication procedure.

Next according to the e-mail address of the relay apparatus notified by server 3, Internet facsimile apparatus 1 transmits an e-mail to relay apparatus 2. The e-mail is attached the image information converted into the data format supported by the relay apparatus, for instance the TIFF format based on the reception capability of the relay apparatus. And the header information of the e-mail is attached a relay transfer instruction command having a facsimile number of final destination 4.

As a reception capability of a relay apparatus registered in server 3, the maximum capability among reception abilities of the relay apparatus or terminal facsimile apparatus connected to the relay apparatus may be registered so that the load in a network can be reduced without transmitting data of over specification.

According to the procedure described above, an operator can transmit a necessary relay transfer instruction command and image information at one transmission operation, that allows to simplify the transmission operation and to reduce the total transmission time.

Next relay apparatus 2 depresses the received image information compressed with a TIFF format, compresses it with, for instance an MR compression, then converts the data that final destination 4 can receive. Further on the basis of a relay transfer instruction command, it fetches the facsimile number of final destination 4 from the received e-mail and transmits the data into the destination.

Further relay apparatus 2 converts the header information of the received e-mail to the image information, compresses it with the same data format as that of the image information, then transmits it with the image information. That allows final destination 4 to output the header information that an ordinary facsimile apparatus does not output. By this way, a receiver can obtain all routing information through which facsimile data passes, such as sender information, relay terminal information and so on.

Further relay apparatus 2 can process the header information edit described in the following, to enable an output image visual. FIG. 5 is a data configuration diagram of Internet facsimile apparatus. FIG. 5A illustrates a data configuration before the header edit and FIG. 5B illustrates a data configuration after the header edit.

As illustrated in FIG. 5A, the e-mail data received by a relay apparatus is attached a variety of information as a header in a front of a facsimile image of main part. The header information contains items unnecessary to output, which makes the received image not visual if all output.

Then with a filter as illustrated in FIG. 5B, some items are deleted so that the necessary items are only left, such as "From", "To", "Subject" and so on. In this manner since no unnecessary item is transmitted, avisual image output can be obtained at final destination 4.

Relay apparatus 2 can select any items at the header information to delete according to operator's requirements so that only the necessary header information is output at a received picture.

Figure 6:
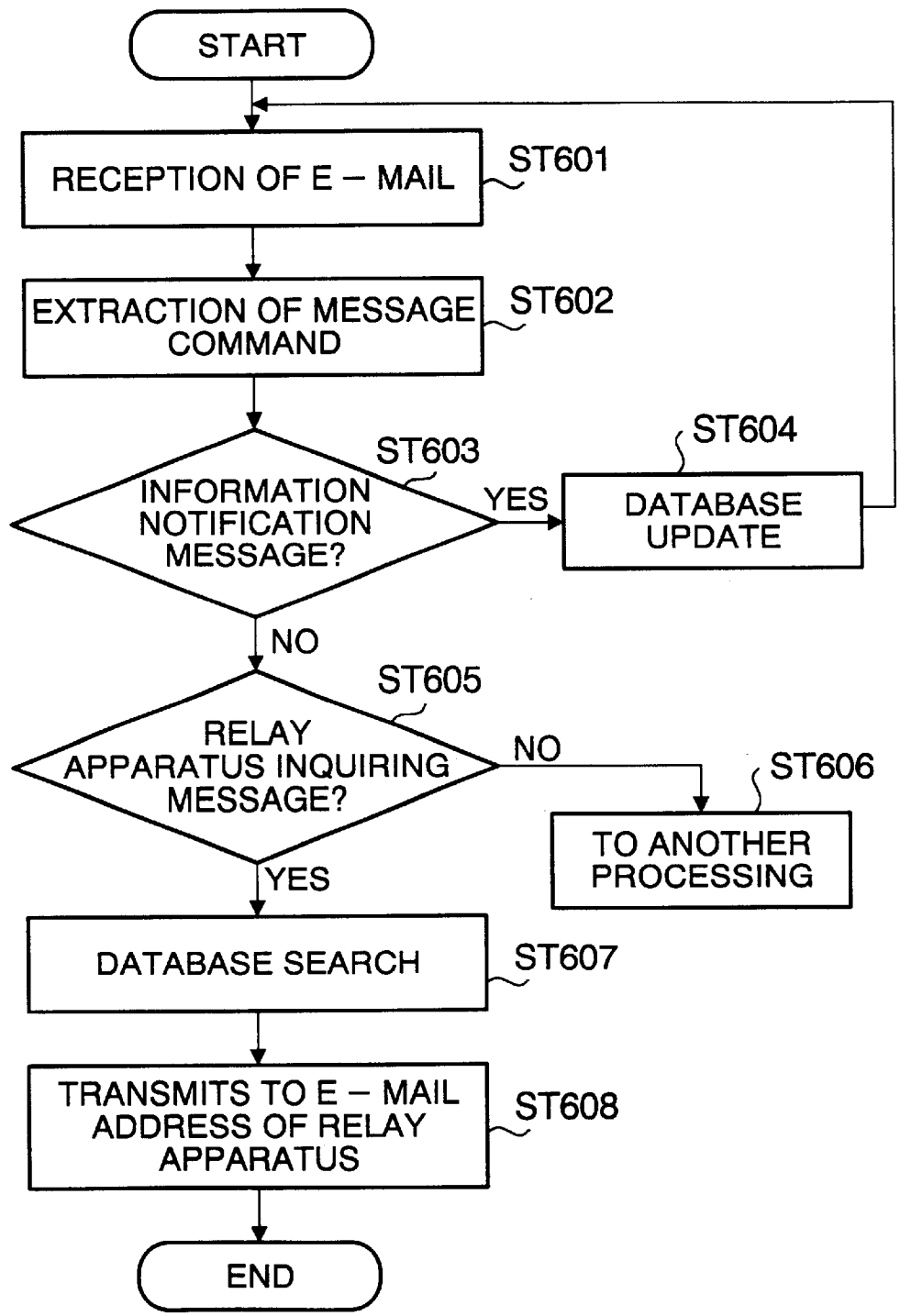
FIG. 6 is a flow chart of a server configured in a network to which the Internet facsimile apparatus in the above embodiment of the present invention is connected.

Next the operations at server 3 are explained with FIG. 6, which is a flow chart illustrating the operations of a server configured in a network to which the Internet facsimile apparatus is connected.

First when an e-mail is received from an Internet facsimile apparatus (ST601), server 3 extracts a message command from the received data (ST602), then decides whether or not it is an information notification message (ST603).

This information notification message is for a new Internet facsimile apparatus to notify its capability for the registration of the items illustrated in FIG. 3 when it is first connected to a network.

In the case where a message command is an information notification message, the database of server 3 is updated to register the new items (ST604). After the registration is finished, an Internet facsimile apparatus is available as a relay apparatus.

In the case where a message command is not an information notification message, it decides whether or not it is a relay inquiring message (ST605). When it is not a relay inquiring message, another processing is executed (ST606).

In the case where a message command is an information notification message, server 3 searches the database by referring a table (ST607), and returns the e-mail address, the reception capability, supported data format of the notified relay apparatus to the Internet facsimile apparatus inquiring (ST608).

In this manner only by notifying a facsimile number of final destination, an operator acquires an e-mail address and others of the Internet facsimile apparatus registered as a relay apparatus at the routing information table. That simplifies the following transmission operations by the operator.

As described above, in the present invention an operator can transmit image information via a relay apparatus only by inputting a facsimile number of the final destination. Then the same output image as that obtained by public switched telephone network can be obtained at the final destination.

What is claimed is:

1. A communication system for receiving image data by facsimile via the Internet and a publicly switched telephone network, said communication system comprising:

a transmission apparatus configured to be connected to the Internet and the publicly switched telephone network;

a plurality of relay apparatuses configured to be connected between the Internet and to the publicly switched telephone network;

a plurality of final destination apparatuses configured to be connected to the publicly switched telephone network, each of said final destination apparatuses having a corresponding facsimile number and a controlling relay apparatus, wherein the controlling relay apparatus is one of said plurality of relay apparatuses; and a server apparatus configured to be connected to the Internet and accessible by said transmission apparatus, said server apparatus comprising a table listing for each of said plurality of final destination apparatuses, the corresponding facsimile number and an address of the controlling relay apparatus;

wherein said transmission apparatus transmits the corresponding facsimile number of one of said plurality of final destination apparatuses to said server apparatus via the Internet to send image data to said one of said plurality of final destination apparatuses, wherein said server apparatus retrieves, from said table, the address of the controlling relay apparatus, associated with said one of said plurality of the final destination apparatuses, and notifies said transmission apparatus of the address of the controlling relay apparatus via the Internet;

wherein said transmission apparatus transmits, via the Internet, the image data contained in an e-mail and the facsimile number corresponding to said one of said plurality of final destination apparatuses to the address of said controlling relay apparatus; and wherein said controlling relay apparatus transmits the image data contained in the e-mail to said one of said plurality of final destination apparatuses by a facsimile procedure, via the publicly switched telephone network, so that the image data is sequentially transmitted through a communication path via the Internet and the publicly switched telephone network.

2. The system according to claim 1, wherein said table of said server apparatus further lists, for each of said plurality of final destination apparatuses, image processing capability information corresponding to said controlling relay apparatus.

3. The system according to claim 2, wherein said image processing capability information comprises a data format and a resolution of an image supportable by said controlling relay apparatus.

4. The system according to claim 2, wherein said server apparatus further notifies said transmission apparatus of said image processing capability information of said controlling relay apparatus, and said transmission apparatus adapts the image data to the image processing capability information and transmits the adapted image data to said controlling relay apparatus.

5. The system according to claim 1, wherein said plurality of final destination apparatuses are configured to be connected only to the publicly switched telephone network.

6. A communication system for receiving image data by facsimile via the Internet and a publicly switched telephone network, said communication system comprising:

a transmission apparatus configured to be connected to the Internet and to the publicly switched telephone network;

a plurality of final destination apparatuses configured to be connected to the publicly switched telephone network, each of said plurality of final destination apparatuses having a corresponding facsimile number;

a plurality of relay apparatuses configured to be connected to the Internet and to the publicly switched telephone network, each of said plurality of relay apparatuses having a relay apparatus address and controlling at least one of said plurality of final destination apparatuses; and a server apparatus connected to the Internet and accessible by said transmission apparatus and said plurality of relay apparatuses, said server apparatus comprising a table listing, for each of said plurality of final destination apparatuses, the corresponding facsimile number and the relay apparatus address of said controlling relay apparatus;

wherein each of said plurality of relay apparatuses registers record data in said table of said server apparatus, said record data comprising a relay apparatus address and a corresponding facsimile number of said at least one of said plurality of final destination apparatuses controlled by said one of said plurality of relay apparatuses;

wherein said transmission apparatus transmits the corresponding facsimile number to said server apparatus via the Internet to send image data to said one of said plurality of final destination apparatuses;

wherein said server apparatus retrieves, from said table, the address of said controlling relay apparatus, associated with said one of said plurality of the final destination apparatuses, and transmits the address of said controlling relay apparatus to said transmission apparatus via the Internet;

wherein said transmission apparatus transmits the image data contained in an e-mail and the facsimile number corresponding to said one of said plurality of final destination apparatuses to the address of said controlling relay apparatus via the Internet; and wherein said controlling relay apparatus transmits the image data contained in the e-mail to said one of said plurality of final destination apparatuses by a facsimile procedure via the publicly switched telephone network, so that the image data is sequentially transmitted through a communication path via the Internet and the publicly switched telephone network.

7. The system according to claim 6, wherein said server apparatus further lists image processing capability information corresponding to each of said plurality of relay apparatuses.

8. The system according to claim 7, wherein said image processing capability information comprises a data format and a resolution of an image supportable by said each of said plurality of relay apparatuses.

9. The system according to claim 7, wherein said each of said plurality of relay apparatuses further notifies said server apparatus of its respective image processing capability information.

10. The system according to claim 9, wherein said server apparatus notifies said transmission apparatus of the image processing capability information of said controlling relay apparatus, and said transmission apparatus adapts the image data to said image processing capability information of said controlling relay apparatus, and then transmits the adapted image data to said controlling relay apparatus.

11. The system according to claim 6, wherein said plurality of final destination apparatuses are configured to be connected only to the publicly switched telephone network.

12. A communication method for receiving image data by facsimile via the Internet and a publicly switched telephone network, said communication method comprising:

transmitting from a transmission apparatus to a server apparatus, via the Internet, a facsimile number corresponding to one of a plurality of final destination apparatuses, said server apparatus comprising a table listing for each of said plurality of final destination apparatuses a corresponding facsimile number and address of a controlling relay apparatus;

retrieving from said table of said server apparatus the address of said controlling relay apparatus associated with said one of said plurality of the final destination apparatuses;

transmitting from said server apparatus to said transmission apparatus, via the Internet, the address of said controlling relay apparatus;

transmitting from said transmission apparatus to said controlling relay apparatus, via the Internet, the image data contained in an e-mail and the facsimile number corresponding to said one of said plurality of final destination apparatuses; and transmitting from said controlling relay apparatus to said one of said plurality of final destination apparatuses, via the publicly switched telephone network by a facsimile procedure, the image data contained in the e-mail, so that the image data is sequentially transmitted through a communication path via the Internet and the publicly switched telephone network;

whereas said transmission apparatus is configured to be connected to the Internet and to the publicly switched telephone network; the server apparatus is configured to be connected to the Internet and accessible by said transmission apparatus; said controlling relay apparatus is one of a plurality of relay apparatuses which is configured to be connected between the Internet and the publicly switched telephone network; and said plurality of final destination apparatuses is configured to be connected to the publicly switched telephone network.

13. The method according to claim 12, wherein said table of said server apparatus further lists image processing capability information corresponding to each of said plurality of relay apparatuses.

14. The method according to claim 13, wherein said image processing capability information comprises a data format and a resolution of an image supportable by each of said plurality of relay apparatuses.

15. The method according to claim 13, further comprising:

transmitting from said server apparatus to said transmission apparatus, via the Internet, said image processing capability information of said controlling relay apparatus;

adapting the image data to the image processing capability information; and transmitting from said transmission apparatus to said controlling relay apparatus, via the Internet, the adapted image data.

16. The method according to claim 11, wherein said plurality of final destination apparatuses are configured to be connected only to the publicly switched telephone network.

17. A method for receiving image data by facsimile via the Internet and a publicly switched telephone network, said communication method comprising:

assigning, from a plurality of relay apparatuses, a controlling relay apparatus to control at least one of a plurality of final destination apparatuses;

transmitting from said controlling relay apparatus to a server apparatus, via the Internet, record data corresponding to said controlling relay apparatus, said record data comprising an address of said controlling relay apparatus and a facsimile number corresponding to each of said plurality of final destination apparatuses controlled by said controlling relay apparatus;

registering said record data in a table contained in said server apparatus;

transmitting, from a transmission apparatus to said server apparatus, via the Internet, a facsimile number corresponding to one of a plurality of final destination apparatuses;

retrieving, from said table of said server apparatus, the address of said controlling relay apparatus associated with said one of said plurality of the final destination apparatuses;

transmitting from said server apparatus to said transmission apparatus, via the Internet, the address of said controlling relay apparatus;

transmitting from said transmission apparatus to said controlling relay apparatus, via the Internet, the image data contained in an e-mail and the facsimile number corresponding to said one of said plurality of final destination apparatuses; and transmitting from said controlling relay apparatus to said one of said plurality of final destination apparatuses, via the publicly switched telephone network by a facsimile procedure, the image data contained in the e-mail, so that the image data is sequentially transmitted through a communication path via the Internet and the publicly switched telephone network;

wherein said transmission apparatus is configured to be connected to the Internet and to the publicly switched telephone network, said plurality of relay apparatuses are being configured to be connected to the Internet and to the publicly switched telephone network; said server apparatus is configured to be connected to the Internet and accessible by said transmission apparatus and said plurality of relay apparatuses, and said plurality of final destination apparatuses are being configured to be connected to the publicly switched telephone network.

18. The method according to claim 17, further comprising listing, on the server apparatus, image processing capability information corresponding to each of said plurality of relay apparatuses.

19. The method according to claim 18, wherein said image processing capability information comprises a data format and a resolution of an image supportable by said each of said plurality of relay apparatuses.

20. The method according to claim 18, wherein said each of said plurality of relay apparatuses further notifies said server apparatus of its respective image processing capability information.

21. The method according to claim 20, further comprising:

transmitting from said server apparatus to said transmission apparatus, via the Internet, said image processing capability information of said controlling relay apparatus;

adapting the image data to the image processing capability information; and transmitting, from said transmission apparatus to said controlling relay apparatus, via the Internet, the adapted image data.

22. The method according to claim 17, further comprising configuring each of said plurality of final destination apparatuses to be connected only to the publicly switched telephone network.

* * * * *